United States Patent
Oyama (10) Patent No.: US 9,862,410 B2
(45) Date of Patent: Jan. 9, 2018

(54) VEHICLE STEERING CONTROL APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/266,820

(22) Filed: Sep. 15, 2016

(65) Prior Publication Data

US 2017/0088168 A1   Mar. 30, 2017

(30) Foreign Application Priority Data

Sep. 25, 2015   (JP) .................................. 2015-188256

(51) Int. Cl.
| | | |
|---|---|---|
| *B62D 6/00* | (2006.01) | |
| *B62D 5/04* | (2006.01) | |
| *G05D 1/02* | (2006.01) | |
| *G08G 1/16* | (2006.01) | |

(52) U.S. Cl.
CPC ........... *B62D 6/005* (2013.01); *B62D 5/0463* (2013.01); *G05D 1/0234* (2013.01); *G05D 1/0268* (2013.01); *B60W 2550/20* (2013.01); *B60W 2710/207* (2013.01); *G08G 1/167* (2013.01)

(58) Field of Classification Search
CPC .... B62D 6/005; B62D 5/0463; G05D 1/0234; G05D 1/0268; B60W 2550/20; B60W 2710/207; G08G 1/167
See application file for complete search history.

(56) References Cited

U.S. PATENT DOCUMENTS

2015/0134204 A1*  5/2015  Kunihiro .............. B62D 15/025
                                                                  701/41

FOREIGN PATENT DOCUMENTS

| JP | 2005-165915 A | 6/2005 |
|---|---|---|
| JP | 2005-346304 A | 12/2005 |
| JP | 2006-178675 A | 7/2006 |
| JP | 2011-189803 A | 9/2011 |
| JP | 2014-113929 A | 6/2014 |

\* cited by examiner

*Primary Examiner* — Michael D Lang
(74) *Attorney, Agent, or Firm* — McDermott Will & Emery LLP (57) ABSTRACT

A vehicle steering control apparatus obtains lane information of a traveling lane and performs, based on the lane information, a steering control. The vehicle steering control apparatus includes a first-target-control-amount calculator, a second-target-control-amount calculator, a limit value calculator, and a steering control executing unit. The first-target-control-amount calculator calculates, based on image information, a target control amount of the steering control as a first target control amount. The second-target-control-amount calculator calculates, based on own vehicle position information and map information, a target control amount of the steering control as a second target control amount. The limit value calculator calculates a limit value of the first target control amount, based on the second target control amount as a reference. The steering control executing unit limits the first target control amount by the limit value, and executes the steering control, based on the limited first target control amount.

5 Claims, 11 Drawing Sheets

VEHICLE STEERING CONTROL APPARATUS

CROSS-REFERENCE TO RELATED APPLICATIONS

The present application claims priority from Japanese Patent Application No. 2015-188256 filed on Sep. 25, 2015, the entire contents of which are hereby incorporated by reference.

BACKGROUND

The technology relates to a vehicle steering control apparatus that obtains lane information with favorable accuracy to perform a steering control.

In recent years, various methods that involve utilization of an automatic driving technique, such as a lane-keeping control and a lane deviation prevention control, have been proposed and developed for vehicles to allow drivers to drive more comfortably. Such a technique obtains a road parameter to be used for a control, through detection by means of a camera, radar, a navigation system, etc. For example, reference is made to Japanese Unexamined Patent Application Publication No. 2005-346304.

SUMMARY

What is desired in an automatic driving technique is, for example, to execute a control including a lane-keeping control and a deviation prevention control with favorable accuracy.

It is desirable to provide a vehicle steering control apparatus that makes it possible to execute a control including a lane-keeping control and a deviation prevention control with favorable accuracy.

An aspect of the technology provides a vehicle steering control apparatus that obtains lane information of a traveling lane and performs, based on the lane information, a steering control. The vehicle steering control apparatus includes: a first-target-control-amount calculator that calculates, based on image information, a target control amount of the steering control as a first target control amount; a second-target-control-amount calculator that calculates, based on own vehicle position information and map information, a target control amount of the steering control as a second target control amount; a limit value calculator that calculates a limit value of the first target control amount, based on the second target control amount as a reference; and a steering control executing unit that limits the first target control amount by the limit value, and executes the steering control, based on the limited first target control amount.

DETAILED DESCRIPTION

In the following some implementations of the technology are described in detail with reference to the accompanying drawings.

Figure 1:
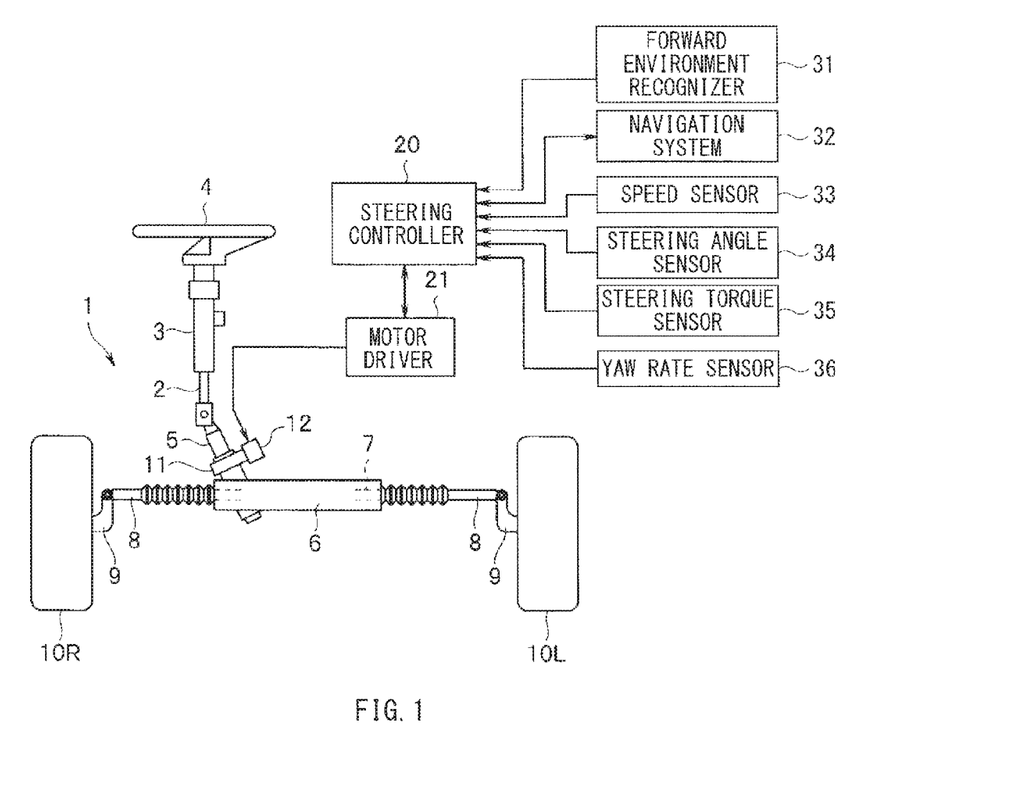
FIG. 1 describes a configuration of a steering system of a vehicle according to one implementation of the technology.

Referring to FIG. 1, an electric power steering apparatus 1 may include a steering shaft 2 rotatably supported by an unillustrated vehicle body frame via a steering column 3. The electric power steering apparatus 1 may allow for free setting of a steering angle independently from an input performed by a driver. The steering shaft 2 may have a first end extending toward a driver's seat and a second end extending toward an engine room. The first end of the steering shaft 2 may be attached with a steering wheel 4, whereas the second end may be coupled to a pinion shaft 5.

The engine room may have a steering gear box 6 that extends in a vehicle width direction. The steering gear box 6 may so support a rack shaft 7 that the rack shaft 7 is inserted therethrough and slidable axially in a reciprocating fashion. The rack shaft 7 may be formed with an unillustrated rack that is in engagement with a pinion formed on the pinion shaft 5, structuring a rack-and-pinion steering gear mechanism.

Both ends on the right and left sides of the rack shaft 7 may protrude from respective ends of the steering gear box 6, and each may be coupled to a front knuckle 9 via a tie rod 8. The front knuckle 9 may pivotably support corresponding one of right and left wheels 10R and 10L as steered wheels, and may be steerably supported by the vehicle body frame. With this configuration, when the steering shaft 2 and the pinion shaft 5 are rotated in response to a driver's operation of the steering wheel 4, the rotation of the pinion shaft 5 may move the rack shaft 7 right and left. The movement of the rack shaft 7 may cause the front knuckles 9 to pivot around respective unillustrated kingpins to steer the right and the left wheels 10R and 10L right and left.

The pinion shaft 5 may be coupled to an electric power steering motor (an electric motor) 12 via an assist transmission mechanism 11. The electric motor 12 may allow for assistance of steering torque to be applied to the steering wheel 4, and addition of the steering torque that achieves a set target steering angle. The electric motor 12 may be driven by a motor driver 21, based on a control amount. The motor driver 21 may receive information on the control amount from a steering controller 20 described below.

The steering controller 20 may be coupled to a forward environment recognizer 31, a navigation system 32, a speed sensor 33, a steering angle sensor 34, a steering torque sensor 35, and a yaw rate sensor 36. The forward environment recognizer 31 may recognize a forward environment ahead of a vehicle to obtain forward environment information. The navigation system 32 may obtain positional information of the own vehicle as own vehicle position information (such as information on latitude, information on longitude, and information on a traveling direction) to display a position of the own vehicle on map information and to perform a route guidance to a destination. The speed sensor 33 may detect a vehicle speed V. The steering angle sensor 34 may detect a steering angle θH. The steering torque sensor 35 may detect steering torque Td. The yaw rate sensor 36 may detect a yaw rate (dθs/dt) of the vehicle.

The forward environment recognizer 31 may include a set of cameras and a stereo image processor. The cameras may be so disposed at a front part of a ceiling in a vehicle interior as to have a certain distance in between, and may capture images of an object outside the vehicle from different perspectives by means of a stereo method. The stereo image processor may process pieces of image data obtained from the cameras.

As one example of processing to be performed, in the stereo image processor of the forward environment recognizer 31, on the pieces of image data obtained from the cameras, the stereo image processor may first obtain a shift amount between corresponding positions in the pair of stereo images. The stereo images as a set may be captured by the respective cameras and directed to m traveling direction of the own vehicle. Based on the thus-obtained shift amount, the stereo image processor may obtain distance information to thereby generate a distance image.

In recognition of the lane lines such as, but not limited to, white lines, a change in luminance in a width direction of a road may be evaluated on the grounds that the lane lines are higher in luminance than a road surface. By performing the evaluation, positions of the right and the left lane lines in an image plane may be identified on the image plane. Positions in real space (x, y, z) of the lane lines may be calculated by any expression of coordinate transformation, based on the positions (i, j) on the image plane and a parallax calculated from the positions on the image plane, i.e., based on the distance information. In this implementation, without limitation, a coordinate system in the real space, set based on a position of the own vehicle as a reference, may be defined as follows. As illustrated by way of example in FIG. 7, a vehicle width direction may be an x-axis, a vehicle height direction may be a y-axis, and a vehicle length direction, i.e., a distance direction, may be a z-axis, where the road surface immediately below a position in the midpoint of the stereo cameras is defined as the origin. An x-z plane where y equals to zero (0) is coincident with the road surface when the road is flat. A road model may be expressed by dividing, in the distance direction, a traveling lane on the road on which the own vehicle travels into a plurality of sections, approximating the right and the left lane lines in each of the sections in a predetermined way, and coupling those approximated lane lines together. Note that, although a description of one implementation is given here with reference to an example where a shape of the traveling course is recognized based on the images obtained by the set of cameras, the shape of the traveling course may alternatively be determined based on image information obtained from a monocular camera, a color camera, or any other method. Accordingly, the forward environment recognizer 31 may provide lane information, based on the image information.

The navigation system 32 may receive a radio signal from, for example, a global positioning system (GPS) satellite to obtain the positional information of the vehicle (such as the information on latitude and the information on longitude). The navigation system 32 may also obtain the vehicle speed V from the speed sensor 33, and obtain the information on the traveling direction from a sensor such as a geomagnetic sensor and an angular velocity sensor. The navigation system 32 may include a navigation ECU, a map database, and a display which are unillustrated. The navigation ECU may generate route information that allows for a navigation function. The map database stores the map information including supplier data and updated data. The display may be a liquid crystal display or any other suitable display.

Figure 9:
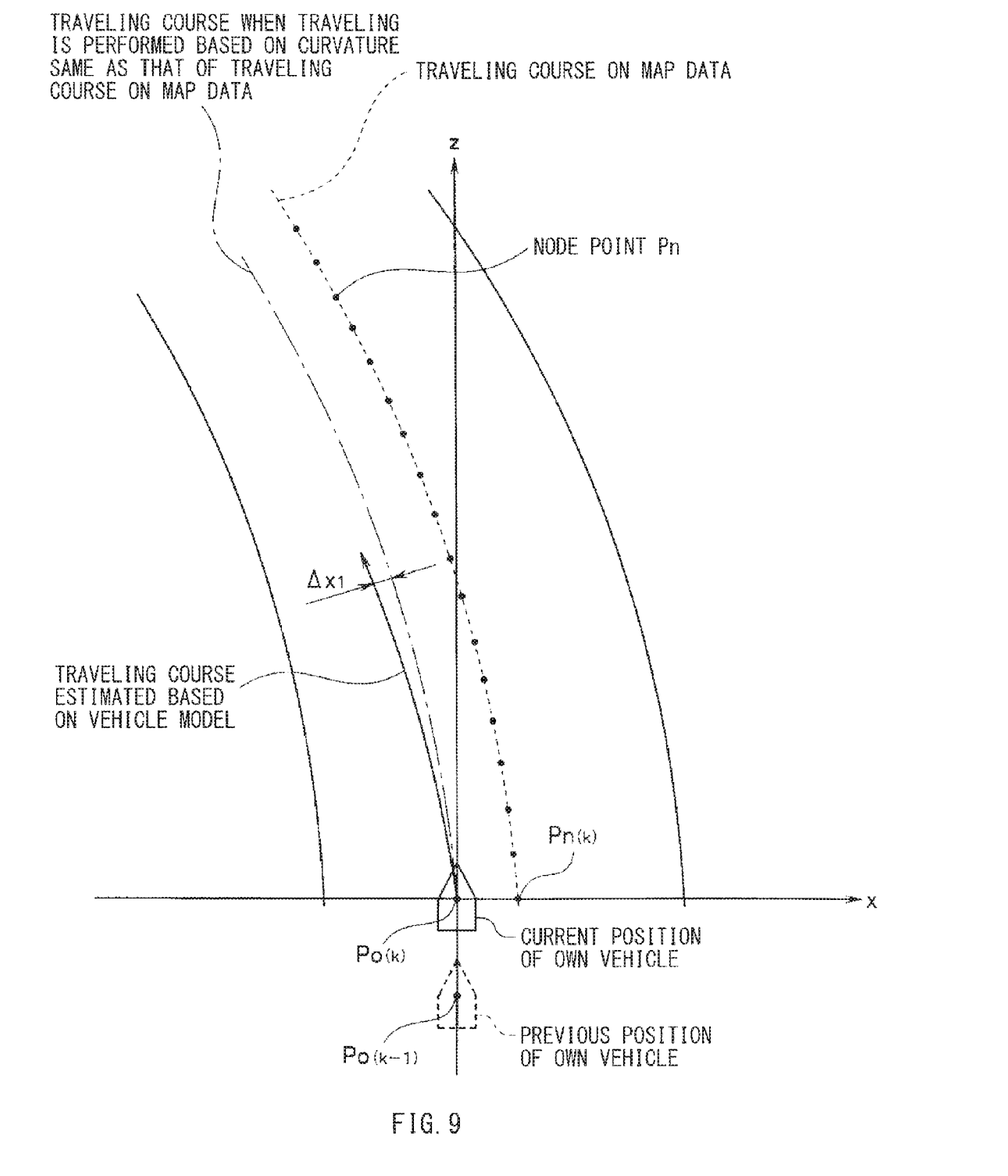
FIG. 9 describes a lateral deviation in a case of traveling along a curve and upon calculation of a second target steering angle according to one implementation of the technology.
Figure 10:
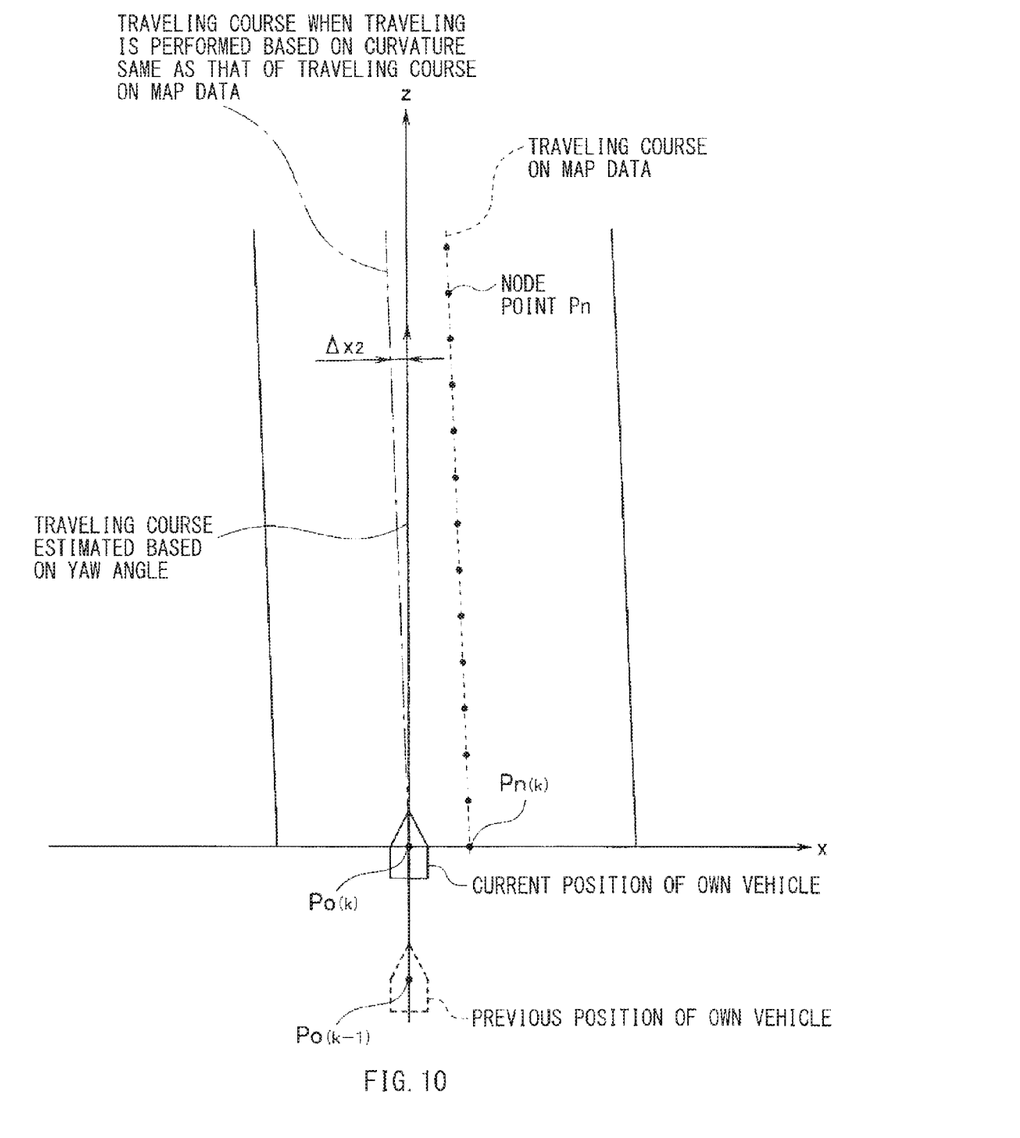
FIG. 10 describes a lateral deviation in a case of traveling along a straight road and upon the calculation of the second target steering angle according to one implementation of the technology.

The navigation ECU may cause the display to display the route information that shows a route to any destination specified by a user. The navigation ECU may also cause the display to display a current position of the vehicle, based on information on the detected position, speed, traveling direction, etc., of the vehicle. The navigation ECU may overlay the route information and the current position of the vehicle on a map image displayed on the display. The map database may store route information necessary for configuring a road map. The information may include, without limitation, node data and facility data. The node data may be related to a position and a shape of a road which configure the map image. The node data may include data on: a coordinate (such as latitude and longitude) of each point (node points Pn) on a road including a fork (an intersection) of a road; a direction and a kind (such as information on whether a road is an expressway, a highway, a local street, etc.) of the road that includes the node points Pn; a type of the road with the node points Pn (such as whether the road with the node points Pn s a straight section, an arc section (or an arc-like curved part), and a clothoid curve section (or a part having a relaxation curve)); and a curve curvature (or a radius). By using the node data, a traveling course of the own vehicle may be identified based on a position on the map on which the current position of the vehicle is overlaid as illustrated in FIGS. 9 and 10. Further, information on the traveling course may be obtained based on information on a node point Pn(k) that is nearest to a position Po(k) of the own vehicle, where the traveling course of the own vehicle is defined as a target traveling course. The traveling course information may include information on the curve curvature (or the radius) of the road and information on a direction of the road. The facility data may include data related to information on a facility located around each node point Pn, and may be stored in association with the node data or data on a link at which the corresponding node is present. Accordingly, the navigation system 32 may provide the lane information, based on the own vehicle position information and the map information.

The steering controller 20 calculates, based on the image information, a target control amount of a steering control as a first target steering angle θt1, calculates, based on the own vehicle position information and the map information, a target control amount of the steering control as a second target steering angle θt2, and calculates limit values (target steering angle limit values θtu and θtd and target steering angular velocity limit values Dθtu and Dθtd) of the first target steering angle θt1, based on the second target steering angle θt2 as a reference. Further, the steering controller 20 limits the first target steering angle θt1 by the target steering angle limit values θtu and θtd and the target steering angular velocity limit values Dθtu and Dθtd, and executes the steering control, based on the limited first target steering angle θt1. The steering controller 20 may perform these processes, based on input signals received from the respective devices and sensors described above and in accordance with a flowchart illustrated in FIG. 3.

Figure 2:
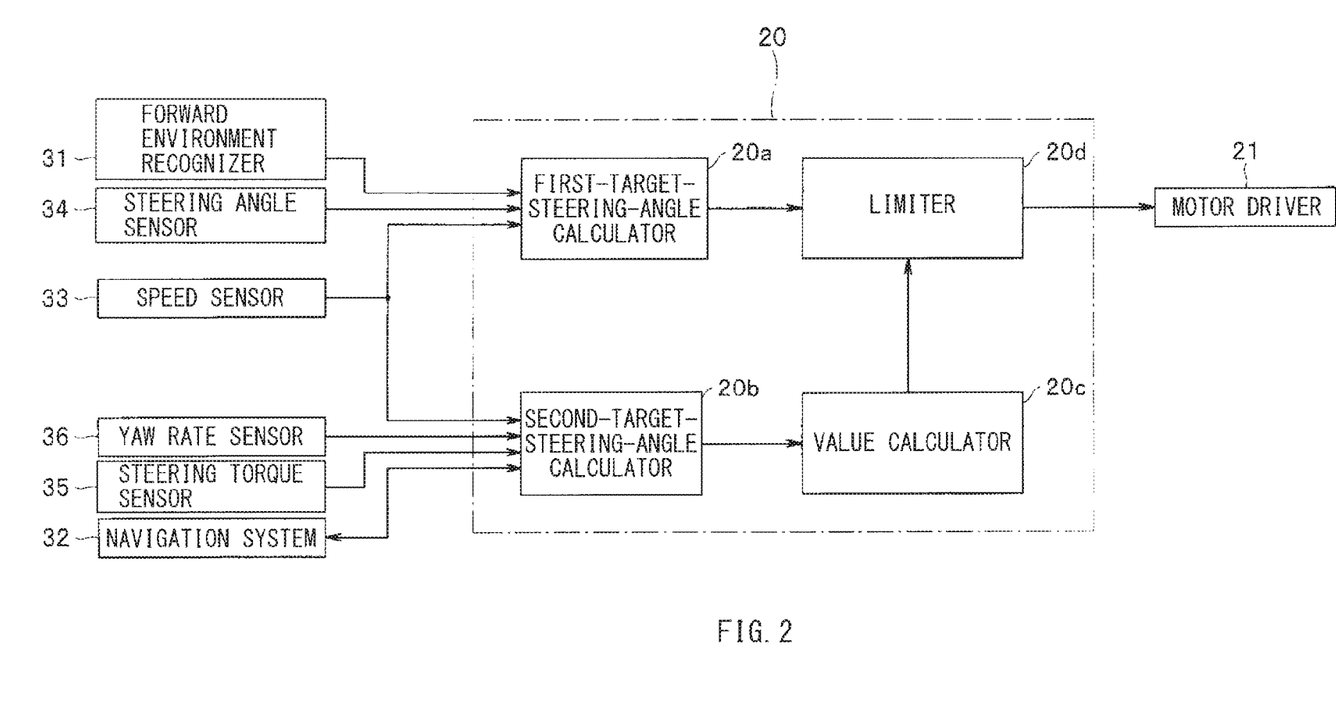
FIG. 2 illustrates functional blocks of a steering controller according to one implementation of the technology.

Hence, as illustrated in FIG. 2, the steering controller 20 may primarily include, without limitation, a first-target-steering-angle calculator 20a, a second-target-steering-angle calculator 20b, a target steering angle limit value and target steering angular velocity limit value calculator (hereinafter simply referred to as a "value calculator") 20c, and a target steering angle and target steering angular velocity limiter (hereinafter simply referred to as a "limiter") 20d.

The first-target-steering-angle calculator 20a may receive the forward environment information from the forward environment recognizer 31, the vehicle speed V from the speed sensor 33, and the steering angle θH from the steering angle sensor 34. The first-target-steering-angle calculator 20a calculates, as the first target steering angle θt1, the target control amount directed to performing of a steering control. The steering control here may so control, based on the image information obtained by the cameras, steering of the own vehicle that the own vehicle follows a lane along a target course. In this implementation, the target course here may be the middle of the lane.

Figure 4:
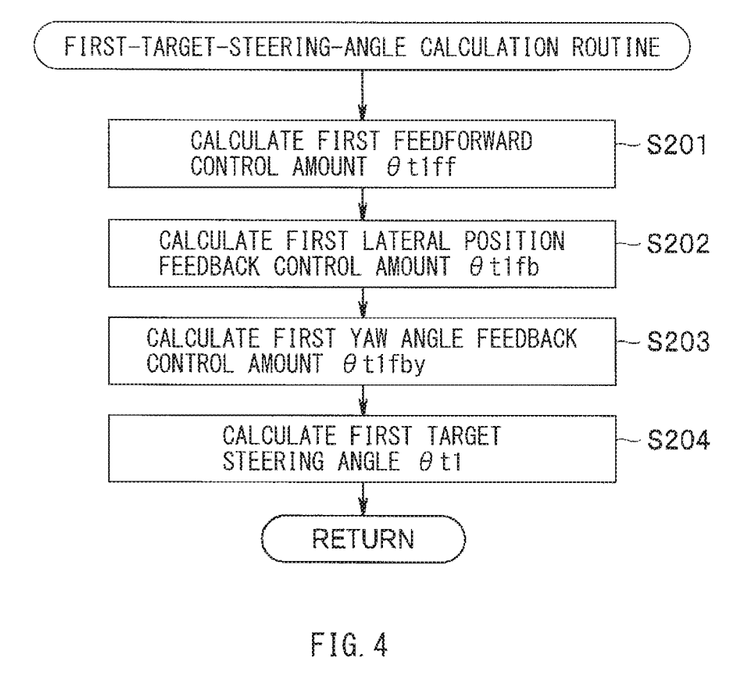
FIG. 4 is a flowchart of a first-target-steering-angle calculation routine according to one implementation of the technology.

More specifically, the first-target-steering-angle calculator 20a may perform the calculation of the first target steering angle θt1 in accordance with a flowchart illustrated in FIG. 4. In the following, an example of the calculation of the first target steering angle θt1 is described with reference to the flowchart of FIG. 4.

First, in step (abbreviated to "S" hereinafter) 201, a first feedforward control amount θt1ff may be calculated from, for example, the following expression (1):

$$\theta t1ff = G1ff \cdot \kappa c \tag{1}$$

where G1ff is a feedforward gain set in advance by experiments, calculation, or other suitable methods, and κc is a curve curvature calculated based on the image information.

Figure 6:
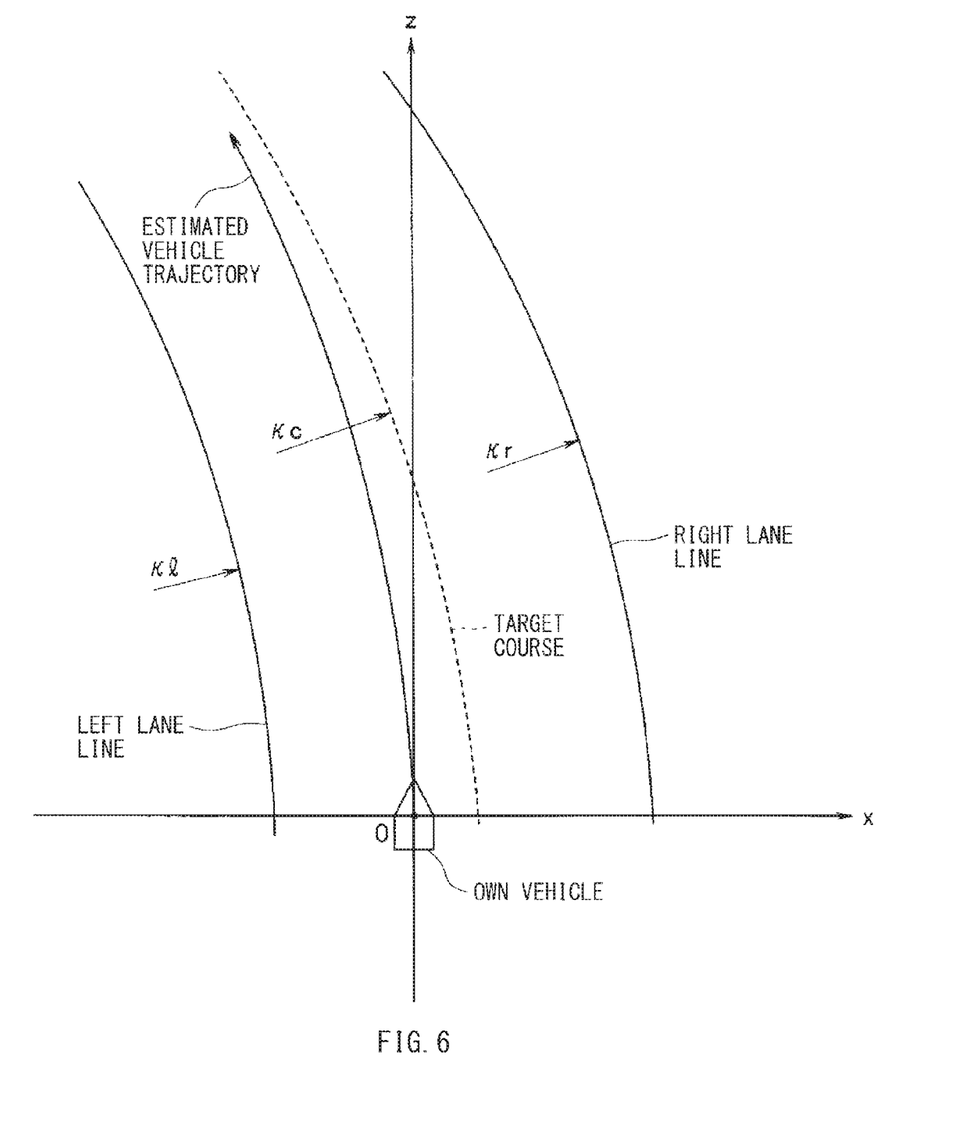
FIG. 6 describes a feedforward control upon calculation of a first target steering angle according to one implementation of the technology.
Figure 7:
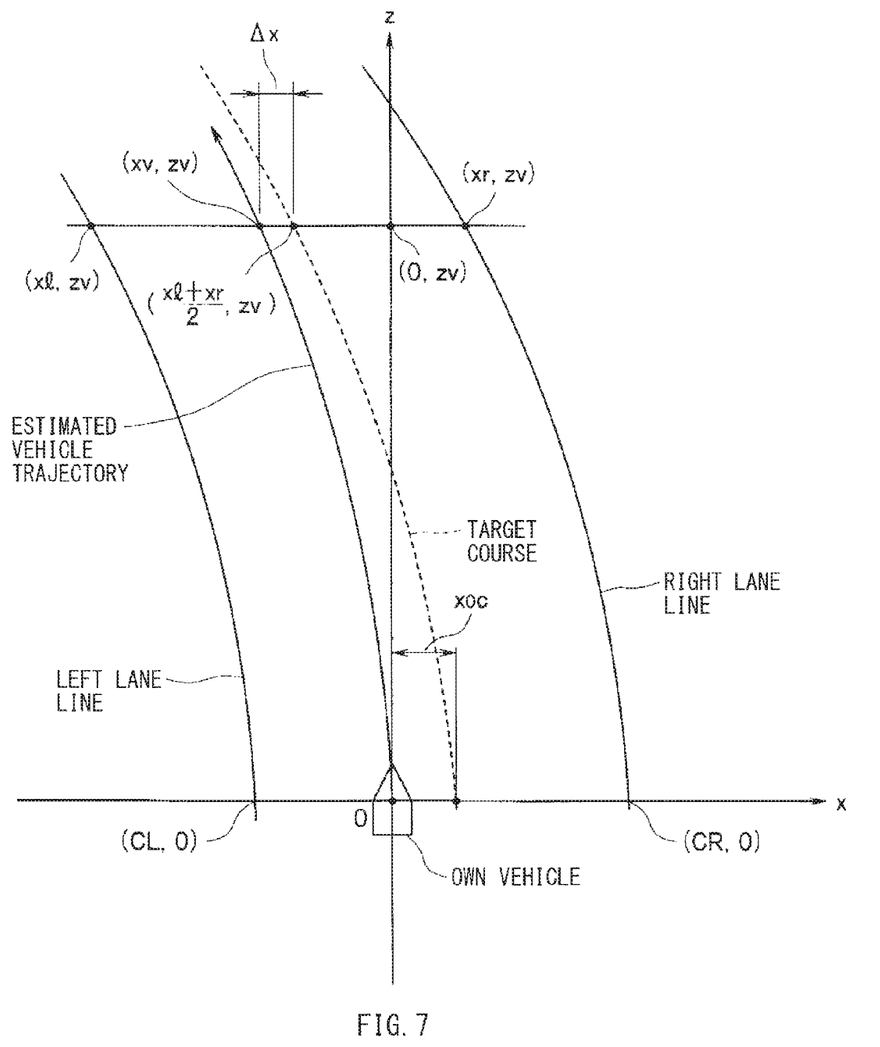
FIG. 7 describes a lateral position feedback control upon the calculation of the first target steering angle according to one implementation of the technology.
Figure 8:
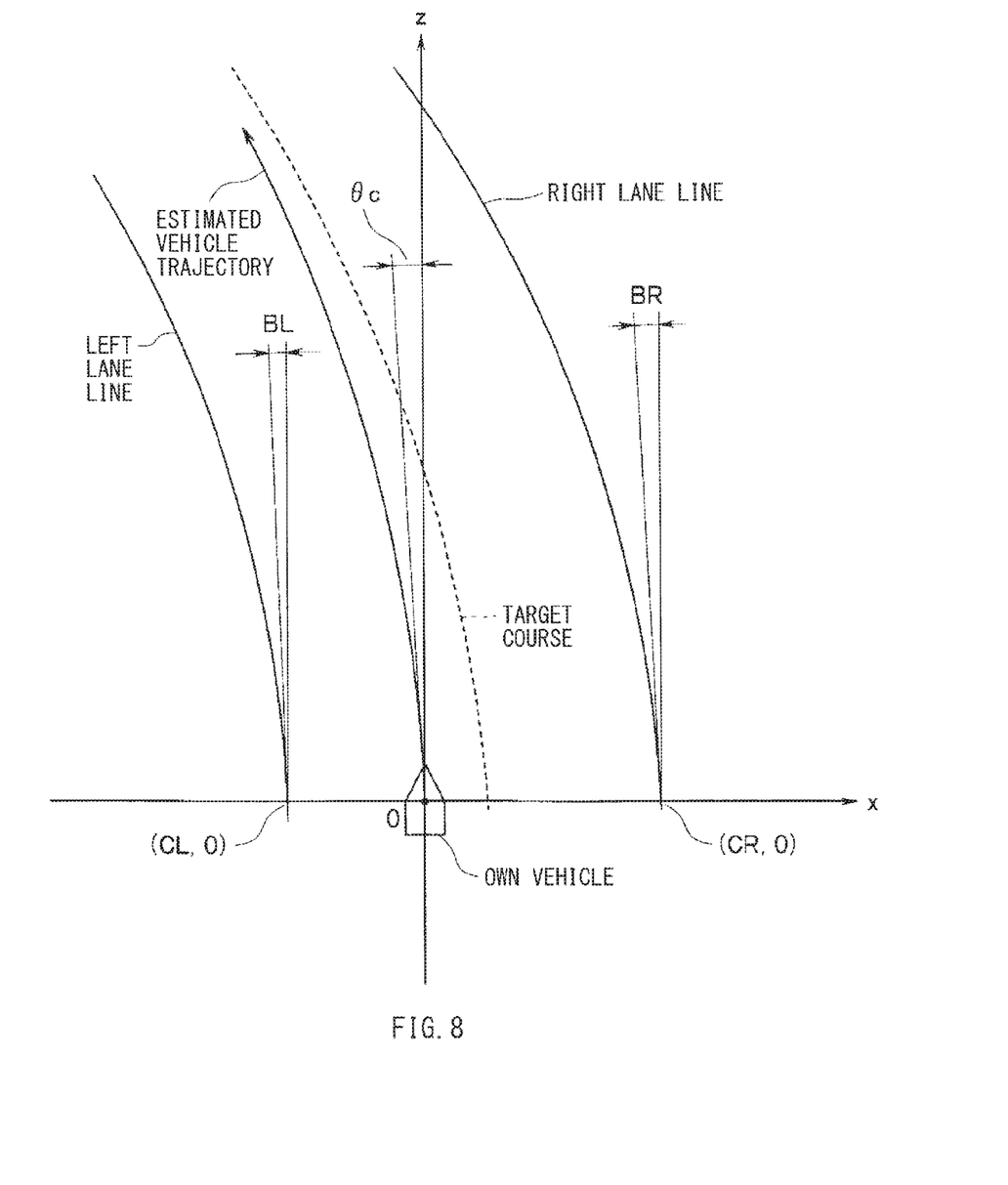
FIG. 8 describes a yaw angle feedback control upon the calculation of the first target steering angle according to one implementation of the technology.

In other words, based on a least-square method, right and left lane lines on an x-z coordinate plane as illustrated in FIGS. 6 to 8 may be approximated by, for example, the quadratic expression: $x = A \cdot z^2 + B \cdot z + C$.

In one specific but non-limiting example, the lane line on the left side of the own vehicle may be approximated, based on a least-square method, by the following expression (2).

$$x = AL \cdot z^2 + BL \cdot z + CL \tag{2}$$

The lane line on the right side of the own vehicle may be approximated, based on a least-square method, by the following expression (3).

$$x = AR \cdot z^2 + BR \cdot z + CR \tag{3}$$

In the foregoing expressions (2) and (3), "AL" and "AR" denote curvatures of the respective curves. A curvature κl of the left lane line may be 2·AL and a curvature κr of the right lane line may be 2·AR. Referring to FIG. 6, a curvature κc of the lane which is based on the image information may therefore be expressed by the following expression (4).

$$\kappa c = (2 \cdot AL + 2 \cdot AR)/2 = AL + AR \tag{4}$$

In the foregoing expressions (2) and (3), "BL" and "BR" denote inclinations of the respective curves in the width direction of the own vehicle, and "CL" and "CR" denote positions of the respective curves in the width direction of the own vehicle.

Thereafter, the flow may proceed to S202 in which a first lateral position feedback control amount θt1fb may be calculated from, for example, the following expression (5):

$$\theta t1fb = G1fb \cdot \Delta x \tag{5}$$

where G1fb is a gain set in advance by experiments, calculation, or other suitable methods. Referring to FIG. 7, Δx may be calculated from, for example, the following expression (6):

$$\Delta x = (x1 + xr)/2 - xv \tag{6}$$

where xv is, on estimated vehicle trajectory, an x-coordinate of a point that has a z-coordinate same as a z-coordinate of a front fixation point (0, zv) of the own vehicle. zv may be a front fixation distance in the z-coordinate from the own vehicle to the front fixation point (0, zv), and may be calculated from, for example, the following expression:

$$zv = tc \cdot V$$

where tc is previously-set prediction time, and may be set to, for example, 1.2 seconds.

Accordingly, in one implementation where a stability factor As that is based on specifications of the own vehicle or unique to the own vehicle, or any other factor, is used based on a traveling state of the own vehicle, xv may be calculated, for example, the following expression (7):

$$xv = (1/2) \cdot (1/(1 + As \cdot V^2)) \cdot (\theta H/Lw) \cdot (tc \cdot V)^2 \tag{7}$$

where Lw is a wheelbase. In the foregoing expression (6), x1 is, on a left lane line, an x-coordinate of a point that has a z-coordinate same as the z-coordinate of the front fixation point (0, zv) of the own vehicle, and xr is, on a right lane line, an x-coordinate of a point that has a z-coordinate same as the Z-coordinate of the front fixation point (0, zv) of the own vehicle.

Alternatively, based on the vehicle speed V and the yaw rate (dθs/dt), the foregoing xv may be calculated from, for example, the following expression (8).

$$xv = (1/2) \cdot ((d\theta s/dt)/V) \cdot (V \cdot tc)^2 \tag{8}$$

Yet alternatively, based on the image information, the foregoing xv may be calculated from, for example, the following expression (9).

$$xv = (1/2) \cdot \kappa c \cdot (V \cdot tc)^2 \tag{9}$$

Thereafter, the flow may proceed to S203 in which a first yaw angle feedback control amount θt1fby may be calculated from, for example, the following expression (10):

$$\theta t1fby = G1fby \cdot \theta c \tag{10}$$

where G1fby is a gain set in advance by experiments, calculation, or other suitable methods. The first yaw angle feedback control amount θt1fby may be directed to a feedback control of a yaw angle of the own vehicle by which the yaw angle of the own vehicle is set to a yaw angle that is based on the target course. Referring to FIG. 8, θc is a yaw angle that is relative to a lane (a to-lane yaw angle) of the own vehicle and based on the image information, and may be calculated from, for example, the following expression (11).

$$\theta c = \tan^{-1}((BL + BR)/2) \tag{11}$$

Thereafter, the flow may proceed to S204 in which the first target steering angle θt1 may be calculated from, for example, the following expression (12).

$$\theta t1 = \theta t1ff + \theta t1fb + \theta t1by \tag{12}$$

The first target steering angle θt1 thus calculated by the first-target-steering-angle calculator 20a may be outputted to the limiter 20d. In one implementation of the technology, the first-target-steering-angle calculator 20a may serve as a "first-target-control-amount calculator".

The second-target-steering-angle calculator 20b may receive the own vehicle position information and the map information from the navigation system 32, the vehicle speed V from the speed sensor 33, the steering torque Td from the steering torque sensor 35, and the yaw rate (dθs/dt) from the yaw rate sensor 36. The second-target-steering-angle calculator 20b calculates, as the second target steering angle θt2, the target control amount directed to performing of a steering control. The steering control here may so control, based on the own vehicle position information and the map information, the steering of the own vehicle that the own vehicle follows a target course. In this implementation, the target course here may be the lane on the map.

Figure 5:
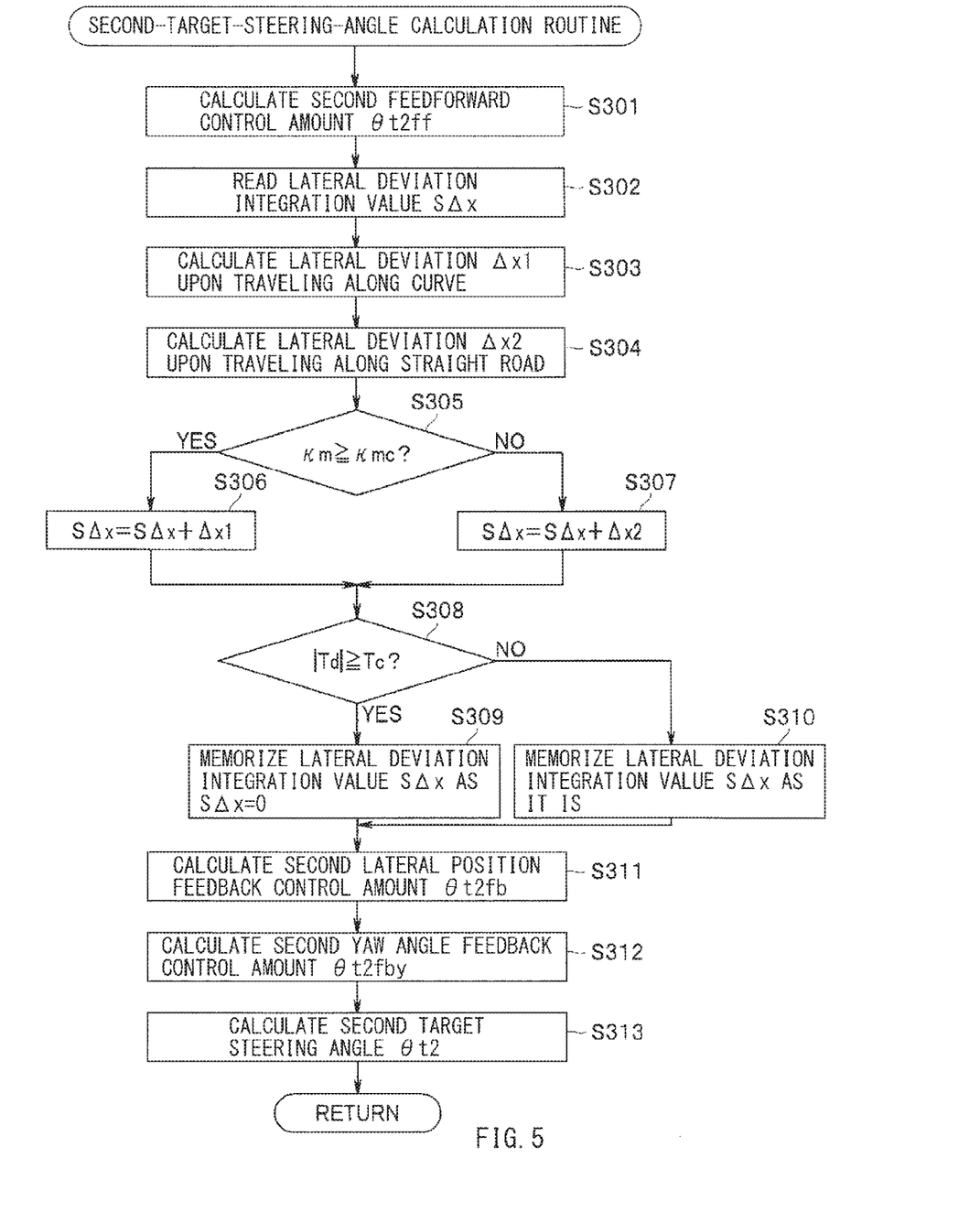
FIG. 5 is a flowchart of a second-target-steering-angle calculation routine according to one implementation of the technology.

More specifically, the second-target-steering-angle calculator 20b may perform the calculation of the second target steering angle θt2 in accordance with a flowchart illustrated in FIG. 5. In the following, an example of the calculation of the second target steering angle θt2 is described with reference to the flowchart of FIG. 5.

First, in S301, a second feedforward control amount θt2ff may be calculated from, for example, the following expression (13):

$$\theta t2ff = G2ff \cdot \kappa m \quad (13)$$

where G2ff is a feedforward gain set in advance by experiments, calculation, or other suitable methods, and κm is a curve curvature obtained based on the information on the node point Pn(k) that is nearest to the position Po(k) of the own vehicle as illustrated in FIG. 9.

Thereafter, the flow may proceed to S302 in which a lateral deviation integration value SΔx currently set in the second-target-steering-angle calculator 20b may be read.

Thereafter, referring to FIG. 9, the flow may proceed to S303 in which the curve curvature κm of the traveling course (the target traveling course) of the own vehicle may be obtained from the information on the node point Pn(k) that is nearest to the position Po(k) of the own vehicle, to calculate a lateral deviation Δx1 upon traveling along a curve from, for example, the following expression (14):

$$\Delta x1 = \kappa m - ((d\theta s/dt)/V) \quad (14)$$

where (dθs/dt)/V is an operation term based on a vehicle motion model and directed to a curve curvature.

Thereafter, referring to FIG. 10, the flow may proceed to S304 in which a direction of the traveling course (the target traveling course) of the own vehicle and the traveling direction of the own vehicle may be obtained from the information on the node point Pn(k) that is nearest to the position Po(k) of the own vehicle, to calculate a lateral deviation Δx2 upon traveling along a straight road from, for example, the following expression (15):

$$\Delta x2 = ((\text{direction of traveling course of own vehicle}) - (\text{traveling direction of own vehicle})) \cdot V \cdot \Delta t \quad (15)$$

where Δt is step time.

Thereafter, the flow may proceed to S305 in which the curve curvature κm (a value based on the map data) of the traveling course of the own vehicle may be compared with a determination value κmc to determine whether the curve curvature κm is equal to or greater than the determination value κmc. The determination value κmc may be a value set in advance by experiments, calculation, or other suitable methods. When the curve curvature f the traveling course of the own vehicle is equal to or greater than the determination value κmc (when κm≥κmc), the flow may proceed to S306 by determining that the own vehicle travels along the curve. In S306, the lateral deviation Δx1 upon traveling along the curve may be added to the lateral deviation integration value SΔx, which is integrated up to the last time, to perform integration of the lateral deviation integration value SΔx (SΔx=SΔx+Δx1).

When the curve curvature κm of the traveling course of the own vehicle is less than the determination value κmc (when κm<κmc), the flow may proceed to S307 by determining that the own vehicle travels along the straight road. In S307, the lateral deviation Δx2 upon traveling along the straight road may be added to the lateral deviation integration value SΔx, which is integrated up to the last time, to perform integration of the lateral deviation integration value SΔx (SΔx=SΔx+Δx2).

The flow may proceed to S308 following the calculation of the lateral deviation integration value SΔx in S306 or S307. In S308, a determination may be made as to whether an absolute value |Td| of the steering torque is equal to or greater than a torque determination value Tc (|Td|≥Tc) and thus there is an input of steering by the driver. The torque determination value Tc may be set in advance by experiments, calculation, or other suitable methods.

The flow may proceed to S309 when a result of the determination in S308 indicates that the absolute value |Td| of the steering torque is equal to or greater than the torque determination value Tc (|Td|≥Tc) and that there is an input of steering by the driver accordingly. In S309, the lateral deviation integration value SΔx may be cleared (SΔx=0) and the cleared lateral deviation integration value SΔx may be memorized. When the result of the determination in S308 indicates that the absolute value |Td| of the steering torque is less than the torque determination value Tc (|Td|<Tc) and that there is no input of steering by the driver accordingly, the flow may proceed to S310 in which the lateral deviation integration value SΔx may be memorized as it is.

Thereafter, the flow may proceed to S311 in which a second lateral position feedback control amount θt2fb may be calculated from, for example, the following expression (16):

$$\theta t2fb = G2fb \, S\Delta x \quad (16)$$

where G2fb is a gain set in advance by experiments, calculation, or other suitable methods.

Thereafter, the flow may proceed to S312 in which a second yaw angle feedback control amount θt2fby may be calculated from, for example, the following expression (17):

$$\theta t2fby = G2fby \cdot \theta m \quad (17)$$

where G2fby is a gain set advance by experiments, calculation, or other suitable methods. The second yaw angle feedback control amount θt2fby may be directed to the feedback control of the yaw angle of the own vehicle by which the yaw angle of the own vehicle is set to a yaw angle that is based on the target course. θm is a to-lane yaw angle of the own vehicle which is based on the own vehicle position information and the map information. The to-lane yaw angle θm may be calculated based on a difference between the traveling direction (an angle) of the own vehicle and azimuth of the road. The traveling direction (the angle) of the own vehicle may be obtained based on a previous own vehicle position Po(k−1) and the current own vehicle position Po(k). The azimuth of the road may be at the node point Pn(k) that is nearest to the current own vehicle position Po(k).

Thereafter, the flow may proceed to S313 in which the second target steering angle θt2 may be calculated from, for example, the following expression (18).

$$\theta t2 = \theta t2ff + \theta t2fb + \theta t2fby \quad (18)$$

The second target steering angle θt2 thus calculated by the second-target-steering-angle calculator 20b may be outputted to the value calculator 20c. In one implementation of the technology, the second-target-steering-angle calculator 20b may serve as a "second-target-control-amount calculator".

The value calculator 20c may receive the second target steering angle θt2 from the second-target-steering-angle calculator 20b.

Further, the value calculator 20c may calculate, based on the received second target steering angle θt2, the target steering angle limit values (target steering angle upper limit θtu and target steering angle lower limit θtd) from, for example, the following expressions (19) and (20):

$$\theta tu = \theta 2 + E\theta \quad (19)$$

$$\theta td = \theta t2 - E\theta \quad (20)$$

where Eθ is an error range, i.e., a safety margin, which is set in advance. Note that Eθ in the expression (19) and that in the expression (20) may have different values from each other. The value calculator 20c may output the calculated target steering angle limit values (the target steering angle upper limit θtu and the target steering angle lower limit θtd) to the limiter 20d.

The value calculator 20c may also calculate, based on the received second target steering angle θt2, a temporal rate of change (dθt2/dt) of the second target steering angle θt2 to calculate the target steering angular velocity limit values (target steering angular velocity upper limit Dθtu and target steering angular velocity lower limit Dθtd) from, for example, the following expressions (21) and (22):

$$D\theta tu = (d\theta t2/dt) + DE\theta \quad (21)$$

$$D\theta td = (d\theta t2/dt) - DE\theta \quad (22)$$

where DEθ is an error range, i.e., a safety margin, which is set in advance. Note that DEθ in the expression (21) and that in the expression (22) may have different values from each other. The value calculator 20c may output the calculated target steering angular velocity limit values (the target steering angular velocity upper limit Dθtu and the target steering angular velocity lower limit Dθtd) to the limiter 20d.

In one implementation of the technology, the value calculator 20c may serve as a "limit value calculator".

The limiter 20d may receive the first target steering angle θt1 from the first-target-steering-angle calculator 20a, and receive the target steering angle limit values (the target steering angle upper limit θtu and the target steering angle lower limit θtd) and the target steering angular velocity limit values (the target steering angular velocity upper limit Dθtu and the target steering angular velocity lower limit Dθtd) from the value calculator 20c.

Figure 11:
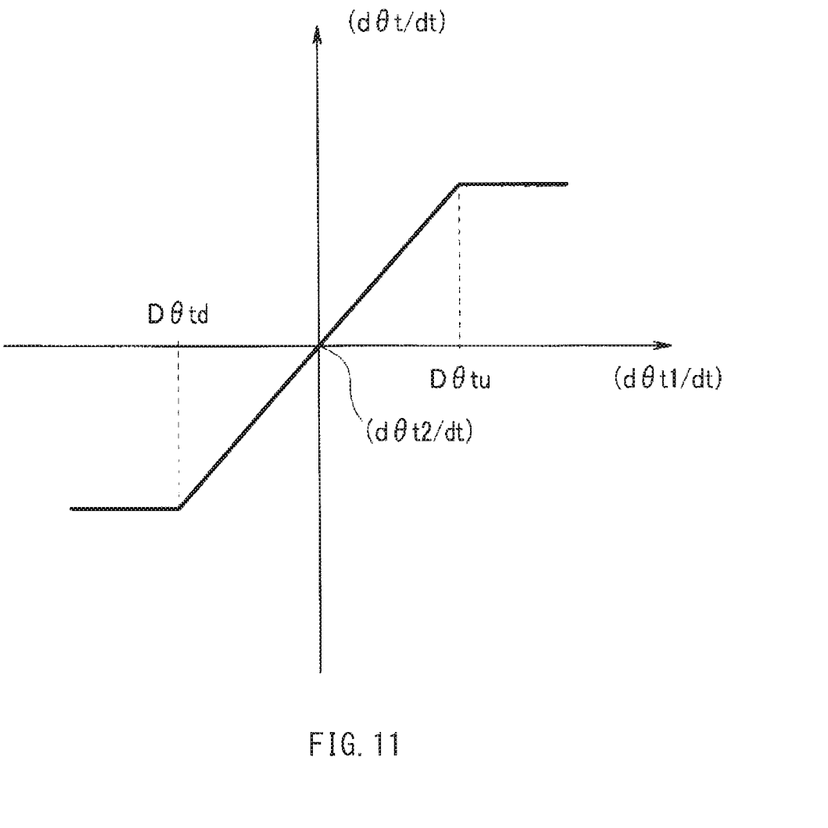
FIG. 11 describes a limitation of a target steering angular velocity according to one implementation of the technology.

Further, the limiter 20d may so limit the first target steering angle θt1 that the first target steering angle θt1 fall within a range defined as θtd<θt1<θtu, and may limit, as a rate limit process, a target steering angular velocity in accordance with, for example, a characteristic diagram illustrated in FIG. 11. The limiter 20d may perform the rate limit process of the target steering angular velocity within a range, in which the temporal rate of change of the second target steering angle θt2 is set as a reference, from the target steering angular velocity upper limit Dθtu to the target steering angular velocity lower limit Dθtd. The limiter 20d may output the thus-limited first target steering angle θt1 to the motor driver 21 as a target steering angle θt to thereby execute the steering control.

In one implementation of the technology, the limiter 20d may serve as a "steering control executing unit".

Figure 3:
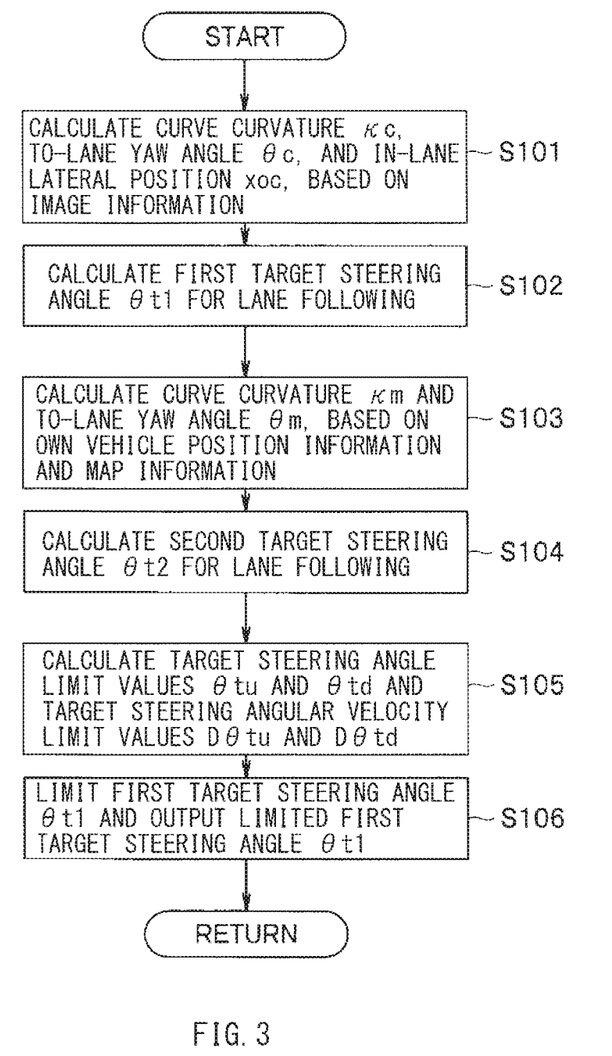
FIG. 3 is a flowchart of a steering control program according to one implementation of the technology.

Next, a description is given, with reference to a flowchart of a steering control program of FIG. 3, of the steering control to be executed by the foregoing steering controller 20.

First, in S101, parameters including the curve curvature κc of the lane, the to-lane yaw angle θc of the own vehicle, and a lateral position in the lane (an in-lane lateral position xoc defined as xoc=(CL+CR)/2; see FIG. 7) may be calculated on an as-needed basis, based on the image information obtained from the cameras.

Thereafter, the flow may proceed to S102 in which the first-target-steering-angle calculator 20a may calculate the first target steering angle θt1 in accordance with, for example, the flowchart illustrated in FIG. 4 as described above.

Thereafter, the flow may proceed to S103 in which parameters including the curve curvature κm of the lane and the to-lane yaw angle θm of the own vehicle may be calculated on an as-needed basis, based on the own vehicle position information and the map information obtained from the navigation system 32.

Thereafter, the flow may proceed to S104 in which the second-target-steering-angle calculator 20b may calculate the second target steering angle θt2 in accordance with, for example, the flowchart illustrated in FIG. 5 as described above.

Thereafter, the flow may proceed to S105 in which the value calculator 20c may calculate the target steering angle limit values (the target steering angle upper limit θtu and the target steering angle lower limit θtd) from, for example, the foregoing expressions (19) and (20), and calculate the target steering angular velocity limit values (the target steering angular velocity upper limit. Dθtu and the target steering angular velocity lower limit Dθtd) from, for example, the foregoing expressions (21) and (22).

Thereafter, the flow may proceed to S106 in which the limiter 20d may so limit the first target steering angle θt1 that the first target steering angle θt1 fall within the range defined as θtd<θt1<θtu, and may perform the rate limit process on the target steering angular velocity in accordance with, for example, the characteristic diagram illustrated in FIG. 11. The limiter 20d may perform the rate limit process on the target steering angular velocity within the range, in which the temporal rate of change of the second target steering angle θt2 is set as a reference, from the target steering angular velocity upper limit Dθtu to the target steering angular velocity lower limit Dθtd. The limiter 20d may output the thus-limited first target steering angle θt1 to the motor driver 21 as the target steering angle θt to thereby execute the steering control.

According to the present implementation of the technology, the target control amount of the steering control is calculated as the first target steering angle θt1, based on the image information, and the target control amount of the steering control is calculated as the second target steering angle θt2, based on the own vehicle position information and the map information. Further, the limit values (the target steering angle limit values θtu and θtd and the target steering angular velocity limit values D$\theta$tu and D$\theta$td) of the first target steering angle $\theta$t1 is calculated, based on the second target steering angle $\theta$t2 as a reference. Moreover, the first target steering angle $\theta$t1 is limited by the target steering angle limit values $\theta$tu and $\theta$td and the target steering angular velocity limit values D$\theta$tu and D$\theta$td, and the steering control is executed based on the limited first target steering angle $\theta$t1. Thus, even if there is an occurrence of erroneous recognition attributed to the image information, it is possible to allow the target steering angle to fall within an acceptable error range, i.e., an acceptable safety margin, by means of the steering angle that is based on the own vehicle position information and the map information. Further, even if there is a sign of change in the target steering angle by the erroneous recognition attributed to the image information, it is possible to allow the target steering angular velocity to fall within an acceptable error range, i.e., an acceptable safety margin, by means of the steering angular velocity that is based on the own vehicle position information and the map information. Accordingly, it is possible to allow a control including a lane-keeping control and a deviation prevention control to be executed with favorable accuracy while, in a situation where a vehicle speed is high, ensuring performance of turning responsiveness and performance of correction steering within a lane, without limiting a road parameter and a control amount more than necessary.

Incidentally, a road parameter calculator may be contemplated that obtains image information of a lane along which an own vehicle travels, and recognizes a traveling lane by means of image processing to determine, based on a result of the recognition, one of a curvature and a curve radius of the traveling lane. The road parameter calculator limits a temporal rate of change of the determined one of the road curvature and the curve radius to a value that is equal to or less than a predetermined limit value, and outputs the limited temporal rate of change as a calculation result.

A lane-keeping control in which a steering control is performed by recognizing lane lines by means of cameras, or any other like control, recognizes a road parameter such as the lane lines as described above. However, when the road parameter is erroneously recognized, the control may be performed based on the erroneously-recognized parameter such as the erroneously-recognized lane lines, leading to a possible occurrence of a lane deviation. To prevent an occurrence of such an event, the temporal rate of change of the determined one of the road curvature and the curve radius may be limited to the value that is equal to or less than the predetermined limit value, as in the road parameter calculator mentioned above. However, limiting the road parameter in this way may lead to difficulties in ensuring performance of turning responsiveness and performance of correction steering within a lane, in a situation where a vehicle speed is high. This may in turn raise a concern that a range in which the lane-keeping control operates is limited.

In contrast, the vehicle steering control apparatus according to one implementation of the technology makes it possible to execute a control including a lane-keeping control and a deviation prevention control with favorable accuracy without limiting a road parameter and a control amount more than necessary.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims the equivalents thereof.

The invention claimed is:

1. A vehicle steering control apparatus that performs, based on lane information of a traveling lane, a steering control for controlling a vehicle to follow the traveling lane, the vehicle steering control apparatus comprising:
a first-target-control-amount calculator that calculates a first target control amount of the steering control for controlling the vehicle to follow the traveling lane along a first target course based on image information obtained by one or more cameras;
a steering controller that executes the steering control by imposing a manipulated variable according to the first target control amount on an electric power steering device;
a second-target-control-amount calculator that calculates a second target control amount of the steering control for controlling the vehicle to follow the traveling lane along a second target course based on own vehicle position information and map information; and
a limit value calculator that calculates a limit value of the first target control amount using the second target control amount;
wherein the steering controller limits the first target control amount to the limit value when the first target control exceeds the limit value, and executes the steering control using the limited first target control amount.

2. The vehicle steering control apparatus according to claim 1, wherein the limit value calculated by the limit value calculator is one or both of a value of the first target control amount and a temporal rate of change of the value of the first target control amount.

3. The vehicle steering control apparatus according to claim 2, wherein the first target control amount and the second target control amount are each a target steering angle.

4. The vehicle steering control apparatus according to claim 1, wherein the first target control amount and the second target control amount are each a target steering angle.

5. A vehicle steering control apparatus that performs, based on lane information of a traveling lane, a steering control for controlling a vehicle to follow the traveling lane, the vehicle steering control apparatus comprising circuitry configured to:
calculate a first target control amount of the steering control for controlling the vehicle to follow the traveling lane along a first target course based on image information obtained by one or more cameras;
execute the steering control by imposing a manipulated variable according to the first target control amount on an electric power steering device;
calculate a second target control amount of the steering control for controlling the vehicle to follow the traveling lane along a second target course based on own vehicle position information and map information;
calculate a limit value of the first target control amount using the second target control amount; and
limit the first target control amount to the limit value when the first target control exceeds the limit value, and execute the steering control using the limited first target control amount.

* * * * *